United States Patent

Smith

[15] 3,673,776

[45] July 4, 1972

[54] ROTARY BLADE APPARATUS

[72] Inventor: James I. Smith, 232 County Road, Tenafly, N.J. 07670

[22] Filed: April 20, 1971

[21] Appl. No.: 135,647

[52] U.S. Cl. ..................56/16.9, 37/43 L, 56/DIG. 2
[51] Int. Cl. ..........................................A01d 35/26
[58] Field of Search.............56/16.9, 15.3, DIG. 2; 37/43 L

[56] References Cited

UNITED STATES PATENTS

| | | | |
|---|---|---|---|
| 2,675,660 | 4/1954 | Barnard | 56/16.9 |
| 3,483,684 | 12/1969 | Price | 56/15.3 X |
| 3,123,962 | 3/1964 | Hester | 56/16.9 |

Primary Examiner—Louis G. Mancene
Assistant Examiner—J. N. Eskovitz
Attorney—William L. Fisher

[57] ABSTRACT

A method is disclosed of pivotally mounting a rotary blade housing on a frame of a rotary blade apparatus which apparatus has a blade shaft adapted to carry a rotary blade and is rotatably supported by said rotary blade housing, said rotary blade housing having an open face affording access to said rotary blade for grass or snow and horizontal and vertical positions on said frame in which said open face faces, respectively, downwardly and forwardly and in which said rotary blade apparatus is operative, respectively, as a grass mower and a snow blower, said rotary blade apparatus also having motor means mounted on said frame, a V-belt power train between said motor means and said blade shaft for rotatably driving the latter, said power train including a gear train mounted on said rotary blade housing, said gear train having an input shaft and said blade shaft for an output shaft, said method comprising providing two longitudinally spaced apart pivot axes, one of which is stationary and the other of which is moveable, axially aligning the motor shaft of said motor means with the stationary pivot axis and axially aligning the gear train input shaft with the moveable pivot axis so that the same said V-belt is useable in either position of said rotary blade housing.

3 Claims, 6 Drawing Figures

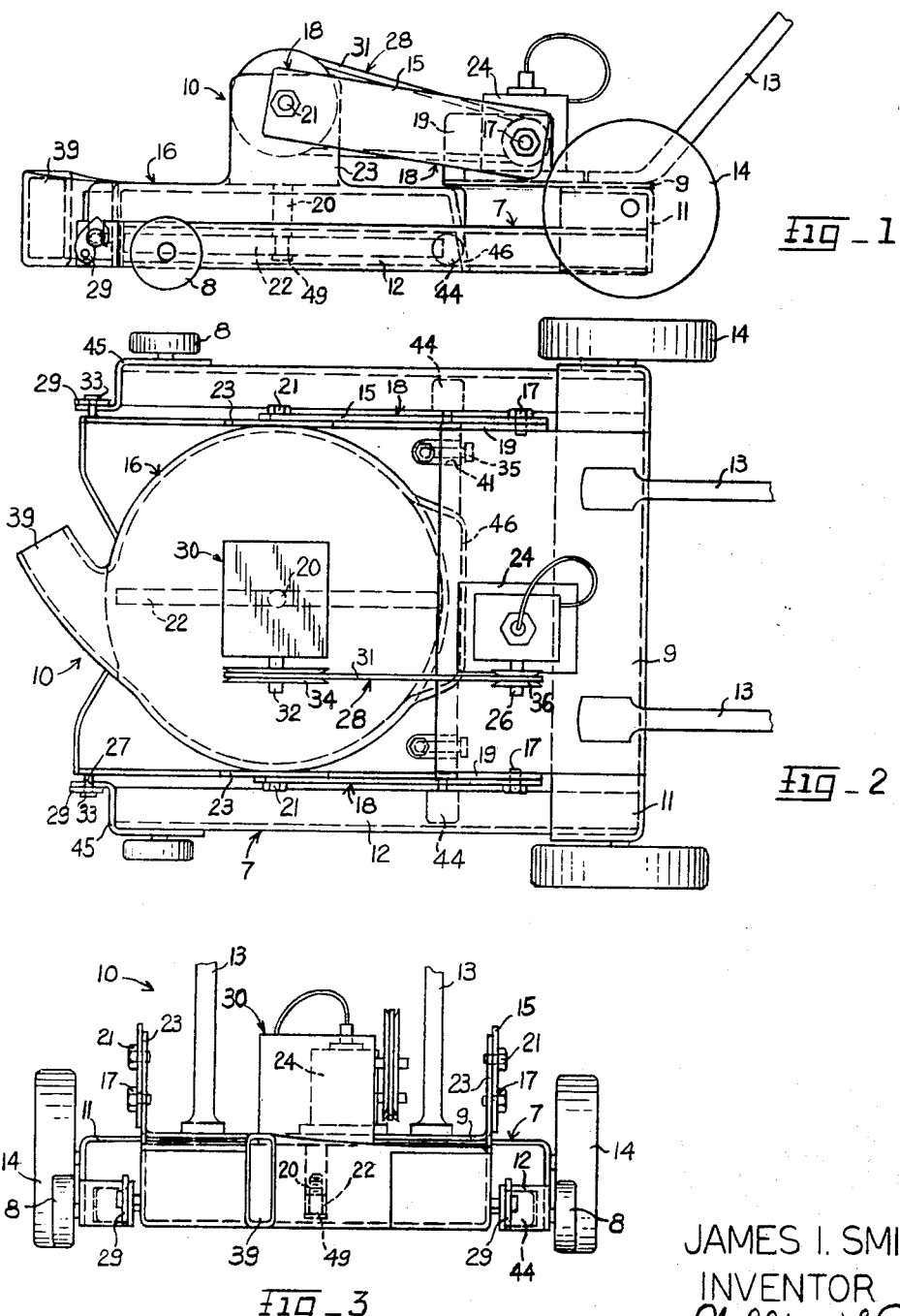

JAMES I. SMITH
INVENTOR
BY William L. Fisher Esq.
HIS ATTORNEY

ROTARY BLADE APPARATUS

My invention relates to a rotary blade apparatus which is both a grass mower and a snow blower.

The principal object of my invention is to provide an improved rotary blade apparatus which is both a grass mower and a snow blower, which can be converted from one to the other, and which employs a pivotably mounted rotary blade housing which permits the power source to remain in a vertical position for both operations.

Figure 4:
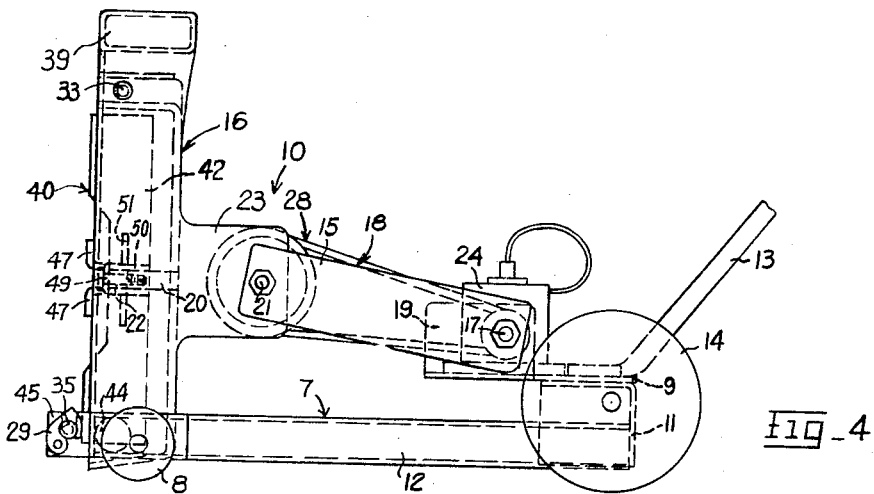
Figure 5:
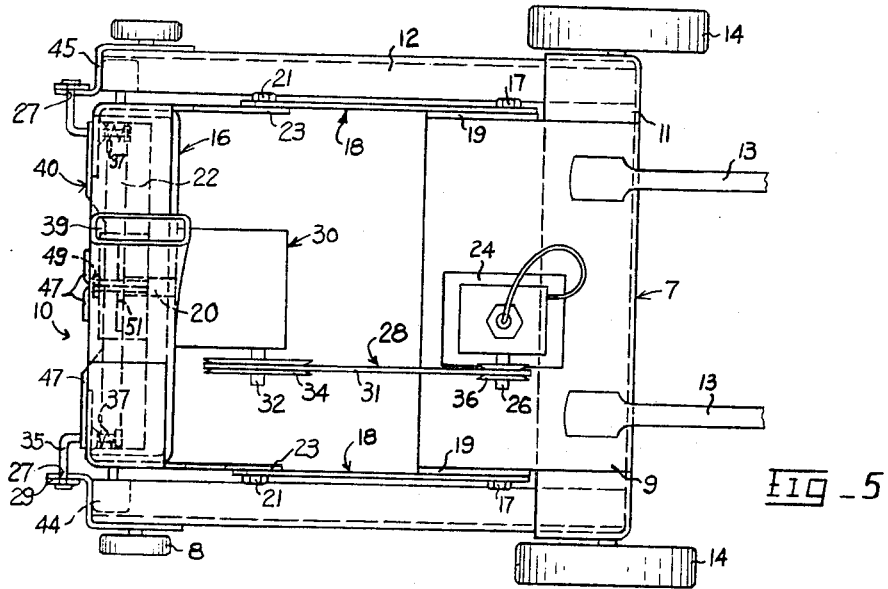
Figure 6:
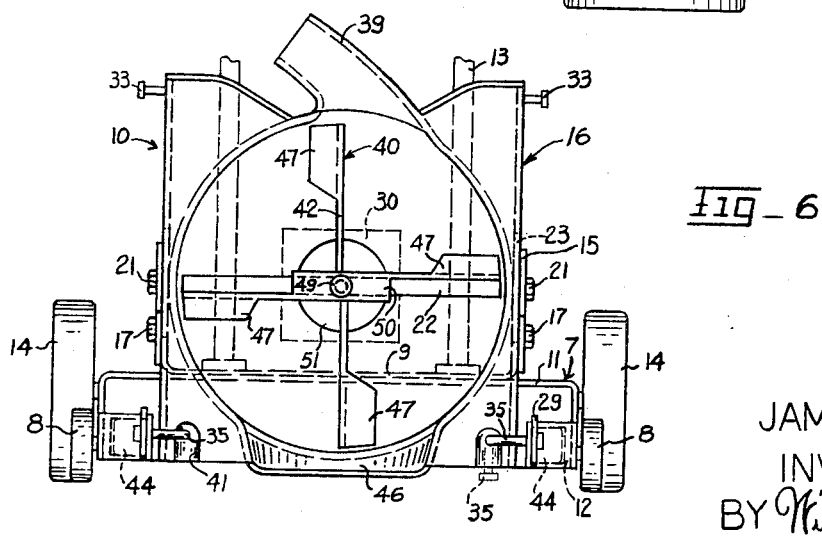

The foregoing object of my invention and the advantages thereof will become apparent during the following description, taken in conjunction with the following drawings, in which:

FIGS. 1–3 are side elevational, top plan and front elevational views, respectively, of a rotary blade apparatus embodying my invention operative as a grass mower; and FIGS. 4–6 are side elevational, top plan and front elevational views, respectively, of said embodiment operative as a snow blower.

Referring to the drawings in greater detail, 10 generally designates said embodiment which comprises a frame 7 supported for rolling movement over terrain by two pairs of wheels 8 and 14 which are located at the front and rear four corners, respectively, of said frame 7. Said frame 7, in the instance, comprises a pair of transversely spaced apart rails 12 connected by a rear transverse cross member 11 which itself has top, rear and side walls. A plate 9 is supported on said cross member 11 which plate 9 supports motor means 24 having a motor output shaft 26, which motor means 24 may be an electrical or a gasoline powered internal combustion engine as indicated. A rotary blade housing 16 is pivotally mounted on said frame 7 by linkage means 18 which includes a pair of links 15 and by a pair of rollers 44 operative, respectively, in said rails 12 and carried on opposite sides of said rotary blade housing 16 at the rear thereof. Said rotary blade housing 16 rotatably supports via its top or back wall a gear train 30 having an input shaft 32 and an output shaft 20 which serves as a rotary blade shaft to which a grass mower blade 22 or a snow blower blade 40 is made fast, as by a bolt 49. Said linkage means 18 includes two longitudinally spaced apart pivot axes for said link 15. One of said pivot axes is defined by pivot connections 17 provided on a pair of transversely spaced apart ears 19 which upstand from said plate 9 at the front thereof. Said pivot axis defined by said pivot connections 17 is stationary with respect to said frame and is axially aligned with said motor shaft 26. The other of said pivot axes is defined by pivot connections 21 provided on a pair of transversely spaced apart ears 23 which upstand from opposite sidewalls of said rotary blade housing 16. Said pivot axis defined by said pivot connections 21 is moveable in respect to said frame and is axially aligned with said input shaft 32. By this manner of pivotally mounting the rotary blade housing 16 and of transmitting power from the motor means 24 to the blade shaft 20, the motor means 24 can remain stationary which obviates complicated carburetion problems in instances when the motor means 24 is a gasoline powered internal combustion engine.

Said frame 7 is provided with a pair of forwardly extending plates 45 at the front ends of the rails 12, each of which plates 45 is provided with an open-ended slot 27 and carries a pivotally mounted locking arm 29. Said rotary blade housing 16 is provided with a pair of oppositely and laterally projecting stationary locking bars 33 at the front thereof which enter into the slots 27 when the said embodiment 10 is operating as a grass mower. Thereafter said locking arms 29 are pivoted rearwardly so that the free ends thereof are engaged over the locking bars 33 to lock said rotary blade housing 16 in its grass mowing position. Said rotary blade housing 16 is provided with a pair of moveable locking bars 35 at the rear thereof which can be rotated into the slots 27 when said embodiment 10 is operating as a snow blower. Each locking bar 35 is angularly bent and double headed and provided with a compression spring 37 at the rear end thereof which normally maintains the shank of the front end of said locking bar 35 pressed inwardly into a depression 41 formed inwardly from the bottom or front face of said rotary blade housing 16 at the rear or bottom end thereof. Each said locking bar 35 when carried in its respective depression 41 has its front head disposed rearwardly of the rear or bottom edge of said rotary blade housing 16 and must be pulled out of said depression 41 and rotated upwardly and outwardly as viewed in FIG. 6 so that its front shank will enter the respective slot 27.

Said motor shaft 26 is operatively connected to said blade shaft 20 by a power train 28 which comprises, in addition to said gear train 30, a pulley wheel 34 fast to said input shaft 32, a pulley wheel 36 fast to said motor shaft 26 and a V-belt 31 operative between said pulley wheels 34 and 36. Said gear train 30 and said pulley wheel 34 move with said rotary blade housing 16 upon pivotal movement of the latter. Said frame 7 has a push handle 13 mounted upon the pate 9 at the rear thereof by which the user of said embodiment can push the same over terrain. Said rotary blade housing 16 is provided with a generally cylindrical side wall perpendicular to said top or back walls and to said bottom or front wall in which side wall is formed, at the front or upper end thereof, an outlet chute 39 through which grass or snow exits depending on the particular function of said embodiment 10. Said side wall at the rear or bottom end thereof is flared rearwardly or downwardly away from said blade shaft 20 to form a snow catching ramp 46 at the bottom center of said rotary blade housing 16 when the same is in position for snow blowing.

Said snow blower blade 40 has a channel shaped hub portion 50 and four equally circumferentially spaced apart arms 42 integral with and projecting outwardly from said hub portion 50. Said hub portion 50 fits over the center portion of said grass mower blade 22 or vice versa and two of said arms 42 extend alongside of and in engagement with said grass mower blade 22. The free ends of the arms 42 are provided with right angularly bent bottom end portions 47 so as to be capable of moving masses of snow while it rotates.

In operation of said embodiment 10, to operate the same as a grass mower said rotary blade housing 16 is locked in a horizontal position to said frame 7 by swinging said locking arms 29 rearwardly over said locking bars 33 to hold the latter in said slots 27. Said motor means 24 is then activated and the user pushes said embodiment 10 over the grass area to be mowed and said grass mower blade 22 cuts the grass by virtue of its rotation at high speed caused by the transmission of power by said power train 28 from said motor shaft 26 to said blade shaft 20. The cut grass is then thrown out said outlet chute 39 to one side of said embodiment 10.

In operation of said embodiment 10, to operate the same as a snow blower, said rotary blade housing 16 is pivoted via said linkage means 18 and rollers 44 on said frame 7 to its vertical position and locked therein by outwardly pulling upon and rotating said locking bars 35 to move them into said slots 27 whereupon said locking arms 29 are swung rearwardly over said locking bars 35 to hold the latter in said slots 27. The snow blower blade 40 is then mounted onto said blade shaft 20 on top or vice versa of said grass mower blade 22. Said motor means 24 is then activated and the user pushes said embodiment 10 over the snow covered area to be snow blowed. As said embodiment 10 is pushed, the snow which is pushed against rides up said ramp 46 into the confines of the snow blower blade 40 and by virtue of rotation at high speed of the latter, snow is thrown out said outlet chute 39 to one side of said embodiment 10.

It will thus be seen that there has been provided by my invention an improved rotary blade apparatus in which the object hereinabove set forth together with many thoroughly practical advantages has been successfully achieved. While a preferred embodiment of my invention has been shown and described it is to be understood that variations and changes may be resorted to without departing from the spirit of my invention as defined by the appended claims.

What I claim is:

1. In rotary blade apparatus operative either as a grass mower or a snow blower having a frame constructed to be pushed over terrain, a rotary blade housing rotatably supporting a blade shaft adapted to carry a rotary blade, said rotary blade housing having an open face affording access to said rotary blade for grass or snow, means for pivotally mounting said rotary blade housing upon said frame so that the former has horizontal and vertical positions on the latter in which said open face faces, respectively, downwardly and forwardly, and in which said rotary blade apparatus is operative, respectively, as a grass mower and a snow blower, the improvement comprising motor means mounted on said frame, a V-belt power train between said motor means and said blade shaft for rotatably driving the latter, said power train including a gear train mounted on said rotary blade housing, said gear train having an input shaft and said blade shaft for an output shaft, linkage means for pivotally mounting said rotary blade housing on said frame, said linkage means providing two longitudinally spaced apart pivot axes, one of which is stationary and axially aligned with the motor shaft of said motor means, and the other of which is moveable and axially aligned with said gear train input shaft, whereby the same said V-belt is useable in either position of said rotary blade housing.

2. Rotary blade apparatus as claimed in claim 1, respective means for locking said rotary blade housing in each of its horizontal and vertical positions in respect to said frame.

3. A method of pivotally mounting a rotary blade housing on a frame of a rotary blade apparatus which apparatus has a blade shaft adapted to carry a rotary blade and is rotatably supported by said rotary blade housing, said rotary blade housing having an open face affording access to said rotary blade for grass or snow and horizontal and vertical positions on said frame in which said open face faces, respectively, downwardly and forwardly and in which said rotary blade apparatus is operative, respectively, as a grass mower and a snow blower, said rotary blade apparatus also having motor means mounted on said frame, a V-belt power train between said motor means and said blade shaft for rotatably driving the latter, said power train including a gear train mounted on said rotary blade housing, said gear train having an input shaft and said blade shaft for an output shaft, said method comprising providing two longitudinally spaced apart pivot axes, one of which is stationary and the other of which is moveable, axially aligning the motor shaft of said motor means with the stationary pivot axis and actually aligning the gear train input shaft with the moveable pivot axis so that the same said V-belt is useable in either position of said rotary blade housing.

* * * * *